United States Patent Office 2,921,948
Patented Jan. 19, 1960

2,921,948

ORGANO-NIOBIUM COMPOUNDS

John C. Brantley, Buffalo, N.Y., assignor to Union Carbide Corporation, a corporation of New York No Drawing. Application August 25, 1955
Serial No. 530,604

7 Claims. (Cl. 260—429)

This invention relates to organo-metallic compounds containing niobium as the metal component and it includes correlated improvements and discoveries whereby such niobium compounds having distinctive properties are obtained.

An object of the invention is to provide organo-metallic compounds containing niobium as the metallic component linked to the organic component by carbon to metal bonds.

Other objects of the invention will in part be obvious and will in part appear hereinafter.

The products of this invention have the general empirical formula:

$$R_2Nb(OH)_nX_y$$

where R is a residue of an organic compound containing a five carbon ring, alicyclic in character, which is hereinafter designated an "alicyclic cyclopentadienyl carbon ring" and has the structure:

X is halogen, $n$ is 0, 1 and 2, $y$ is 0, 1, 2 and 3 and $n+y$ is 0, 1, 2 and 3, the organic residues and atoms of niobium in said compounds being in the ratio of 2:1. More particularly, the organic-niobium compounds have the empirical formulas: $R_2NbX_3$; $R_2NbX_2$; $R_2Nb(OH)_2X$; $R_2Nb(OH)X_2$; $R_2Nb(OH)X$; $R_2NbX$ and $R_2Nb$ wherein X and R are as defined above, and specifically the empirical formulas: $(C_5H_5)_2NbCl_3$, bis(cyclopentadienyl) niobium trichloride; $(C_5H_5)_2NbCl_2$, bis(cyclopentadienyl) niobium dichloride; $(C_5H_5)_2Nb(OH)_2Cl$, bis(cyclopentadienyl)niobium dihydroxymonochloride $$(C_5H_5)_2Nb(OH)Cl_2$$

bis ( cyclopentadienyl ) niobium monohydroxydichloride; $(C_5H_5)_2Nb(OH)Cl$, bis(cyclopentadienyl) monohydroxymonochloride; $(C_5H_5)_2NbCl$, bis(cyclopentadienyl)niobium chloride and $(C_5H_5)_2Nb$, bis(cyclopentadienyl) niobium.

Such dihalides and hydroxy dihalides are solid crystalline compounds which crystallize in the form of brown and of yellow solids, respectively. They are soluble in benzene and acetone but insoluble in dilute hydrochloride acid.

The alicyclic character of the carbon ring is essential for purposes of this invention. For example, both cyclopentadiene and indene contain an alicyclic cyclopentadienyl ring structure; cyclopentadiene having no double bond coordinately shared with an aromatic ring and indene having only one double bond of the cyclopentadienyl ring coordinately shared with an aromatic ring. In contrast, the five carbon ring in fluorene, where each of the double bonds in such ring is coordinately shared with an aromatic ring, is not an alicyclic cyclopentadienyl ring structure.

The organo-metallic compounds of this invention may be produced by formation of an alkali metal derivative of an organic compound containing the cyclopentadienyl carbon ring and reaction of the resulting organo-alkali metal compound with a niobium halide as disclosed and claimed in the co-pending application of Lynch and Brantley, entitled "Process for Producing Organo-Metallic Compounds," bearing Serial No. 381,970 and filed September 23, 1953. However, the process there disclosed and claimed forms no part of this invention.

According to that process an alkali metal derivative of an organic compound containing an alicyclic cyclopentadienyl carbon ring may be reacted with niobium pentahalide or niobium oxyhalide to produce the dihalides of this invention. It is to be understood that the term "niobium halide" as used herein includes oxyhalides as well as halides which contain no oxygen. Thus, included within the term are compounds having the general formulas: $NbX_5$ and $NbOX_3$ where X is halogen and more particularly, compounds of the following formulas: $NbCl_5$, $NbBr_5$, $NbOCl_3$ and $NbOBr_3$. The preferred halogens and halogen components of halides for purposes of this invention are those which have an atomic number of at least 17, namely, chlorine, bromine and iodine.

As an illustrative embodiment of a manner in which the invention may be practiced, the following example is presented, a protective atmosphere of inert gas such as nitrogen or argon being employed where noted.

Example

A suspension of cyclopentadienyl sodium was prepared from 19.8 g. of finely divided sodium metal and 62.7 ml. of freshly distilled cyclopentadiene in 450 ml. of ethylene glycol dimethyl ether. The reaction was conducted under an argon atmosphere up to the hydrolysis stage because of the high reactivity of the sodium dispersion and the sodium cyclopentadiene compound. 77.9 g. of niobium pentachloride were suspended in 400 ml. of benzene and this supension cooled to about 0° C. using an ice bath. The cyclopentadienyl sodium solution was added thereto dropwise with stirring giving a slightly exothermic reaction and forming a brown-colored precipitate as a product. The temperature of the reaction was maintained below 30° C. and stirring was continued for about 20 minutes. The reaction mixture which contained bis (cyclopentadienyl)niobium trichloride as well as the dichloride was hydrolyzed with ice cold dilute hydrochloric acid. The hydrolyzed mixture was filtered giving a brownish-yellow filter cake which was dried in vacuo and extracted with benzene. The benzene soluble fraction yielded a brown-yellow solid which was separated into a brown solid and a yellow solid by fractional crystallization from benzene. The brown solid was determined to be $(C_5H_5)_2NbCl_2$, which is bis(cyclopentadienyl)niobium dichoride, and the yelow solid to be $(C_5H_5)_2Nb(OH)Cl_2$, which is bis(cyclopentadienyl)niobium monohydroxydichloride. The latter was formed by hydrolysis of bis (cyclopentadienyl)niobium trichloride.

Taking as illustrative reactants niobium pentachloride and sodium cyclopentadiene, their reaction with the formation of bis(cyclopentadienyl)niobium dichloride may be represented by the equation $$3(C_5H_5)Na + NbCl_5 \rightarrow (C_5H_5)_2NbCl_2 + 3NaCl + \text{organic products}$$

Formation of bis(cyclopentadienyl)niobium trichloride may be expressed as:

$$2C_5H_5Na + NbCl_5 \rightarrow (C_5H_5)_2NbCl_3 + 2NaCl$$

Furthermore, in a manner similar to that above described, compounds of the type $R_2Nb$, wherein R is an organic residue as previously defined, may be prepared utilizing an excessive amount of sodium cyclopentadiene $C_5H_5Na$ which will reduce $NbCl_5$ to a niobium compound of a lower state of oxidation, which will react with the $C_5H_5Na$ to produce $(C_5H_5)_2Nb$.

The compounds of this invention may be employed in catalytic amounts to catalyze the curing or polymerization of air curing films such as drying oils, alkyd resins and curable silicones. The compounds of this invention are also, by reason of their color, their solubility in organic oils and their ability to impart color to solutions and solids in which they are dissolved or with which they are compatible, adapted to serve as coloring agents.

Having described my invention, what I claim as new and desire to secure by Letters Patent is:

1. An organo-niobium compound having the empirical formula:

$$R_2Nb(OH)_nX_y$$

wherein R is selected from the group consisting of the cyclopentadienyl and the indenyl radicals, X represents halogen, $n$ is an integer selected from the group consisting of 0, 1 and 2, $y$ is an integer selected from the group consisting of 0, 1, 2 and 3 and $n+y$ is an integer selected from the group consisting of 2 and 3.

2. An organo-niobium halide compound having the empirical formula:

$$(C_5H_5)_2NbX_w$$

wherein X represents halogen selected from the group consisting of chlorine, bromine, and iodine, $C_5H_5$ represents cyclopentadienyl and $w$ is an integer selected from the group consisting of 2 and 3.

3. An organo-niobium compound having the empirical formula:

$$(C_5H_5)_2Nb(OH)X_2$$

wherein X represents halogen selected from the group consisting of chlorine, bromine, and iodine, and $C_5H_5$ represents cyclopentadienyl.

4. Bis(cyclopentadienyl)niobium trichloride.
5. Bis(cyclopentadienyl)niobium dichloride.
6. Bis(cyclopentadienyl)niobium monohydroxydichloride.
7. Bis(cyclopentadienyl)niobium dihydroxymonochloride.

References Cited in the file of this patent

UNITED STATES PATENTS

| | | |
|---|---|---|
| 2,818,416 | Brown et al. | Dec. 31, 1957 |
| 2,864,843 | De Witt et al. | Dec. 16, 1958 |

FOREIGN PATENTS

| | | |
|---|---|---|
| 1,080,357 | France | May 26, 1954 |

OTHER REFERENCES

Wilkinson et al.: "J.A.C.S." 76, 4281–4284, Sept. 5, 1954.